(Model.)
C. S. WOODRUFF.
Toe Weight for Horses.
No. 230,385. Patented July 20, 1880.
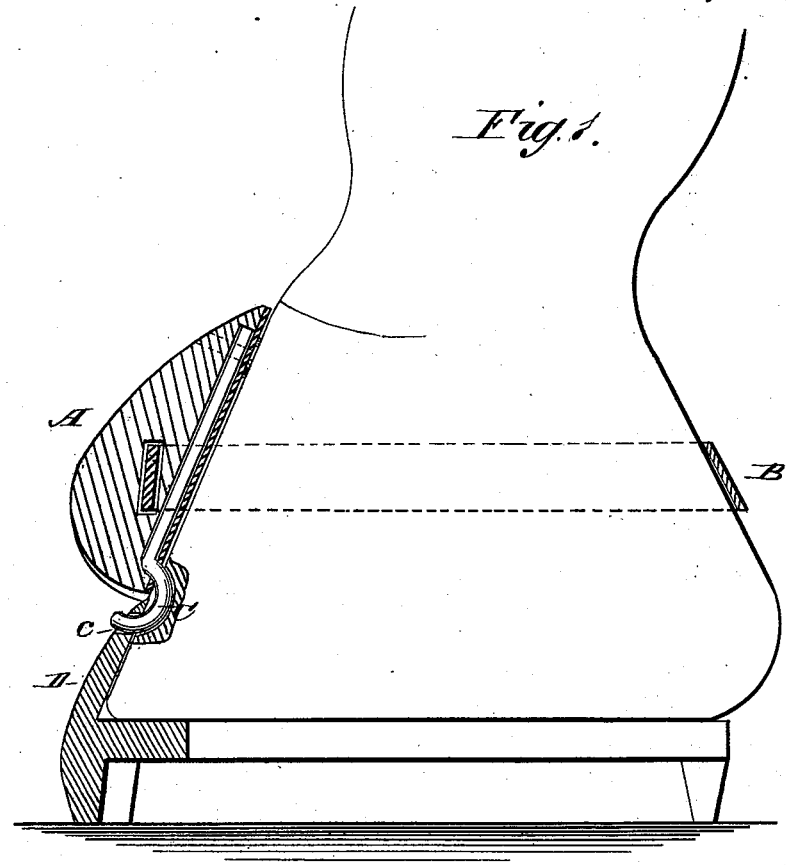
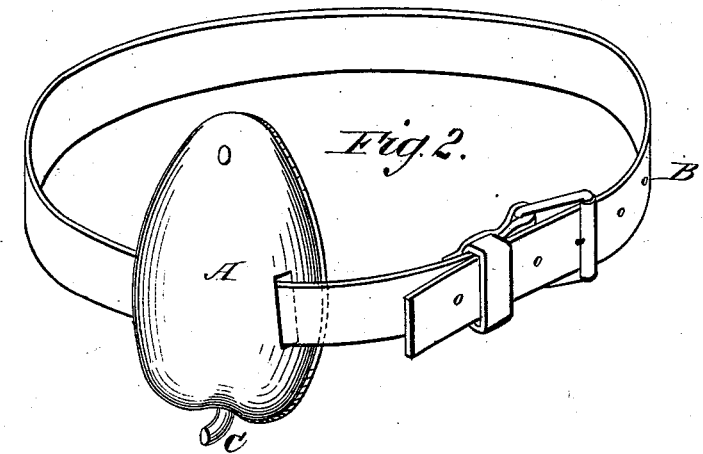
WITNESSES:
INVENTOR:
ATTORNEYS.

UNITED STATES PATENT OFFICE.

CHARLES S. WOODRUFF, OF TROY, NEW YORK.

TOE-WEIGHT FOR HORSES.

SPECIFICATION forming part of Letters Patent No. 230,385, dated July 20, 1880.

Application filed May 18, 1880. (Model.)

*To all whom it may concern:*

Be it known that I, CHARLES S. WOODRUFF, of Troy, in the county of Rensselaer and State of New York, have invented a new and Improved Toe and Side Weight for Trotting and Road Horses, of which the following is a specification.

The object of my invention is to provide, in addition to the ordinary strap by which toe-weights are usually secured to the feet of trotting and road horses, a fastening device by which the weight is firmly secured in position.

In the drawings, Figure 1 shows my invention as applied to a horse's foot, the view being a section of the hoof and weight. Fig. 2 is a perspective view of my invention as applied to a toe-weight.

Similar letters of reference indicate corresponding parts.

A is the toe-weight, provided, as usual, with the strap B, by which it is fastened to the horse's foot. In my device the strap passes through a transverse slot in the weight.

In order to more securely fasten the weight in its adjusted position, and to prevent all possibility of the pounding of the hoof by the weight, I firmly secure to the inner side of the lower part of the weight the downwardly and outwardly projecting hook C. A hole, $c$, being punched in the clip or upward projection, D, usually made by the blacksmith on the top part of the shoe, the hook of the toe-weight is passed through the hole from behind, a small cavity being made in the hoof behind the clip to permit of the adjustment. The weight is then further fastened by buckling the strap around the foot in the usual manner. By this manner of attaching the weight the concavity of the inner side of the weight may be perfectly fitted to the convexity of the hoof, and the weight in all respects held rigidly to its adjusted position.

Clips being placed at proper points on the shoe, side weights are attached in precisely the same manner as the toe-weights.

I also propose to apply my invention to leather or other hoof-boots that cover the whole hoof or any part thereof and front and side of the lower part of the leg, and are usually fastened with strap and buckle at the side or rear part of the foot.

I am aware that it is not new in toe-weights to pass a strap transversely through them, or to use a spur at the lower extremity that enters a hole in the toe of shoe, or to provide a quarter-boot with a toe-weight secured by a clip fitting between the hoof and shoe; but What I do claim as new is—

The combination, with a horseshoe provided with a vertical apertured toe-clip, of a toe-weight having a curved hook attached to the inner side of the weight, and adapted to enter the aperture of the clip, all substantially as and for the purpose set forth.

CHARLES S. WOODRUFF.

Witnesses:
JNO. F. PORTER,
HENRY P. LARKIN.